United States Patent
Ulbrich et al.

(10) Patent No.: US 10,303,177 B2
(45) Date of Patent: May 28, 2019

(54) MOTOR VEHICLE CONTROL APPARATUS AND METHOD FOR OPERATING A CONTROL APPARATUS FOR AUTONOMOUSLY DRIVING A MOTOR VEHICLE

(71) Applicant: VOLKSWAGEN AG, Wolfsburg (DE)

(72) Inventors: Simon Ulbrich, Braunschweig (DE); Simon Großjohann, Wolfsburg (DE); Christian Appelt, Gifhorn (DE); Kai Homeier, Hannover (DE)

(73) Assignee: Volkswagen AG (DE)

( * ) Notice: Subject to any disclaimer, the term of this patent is extended or adjusted under 35 U.S.C. 154(b) by 260 days.

(21) Appl. No.: 15/590,737

(22) Filed: May 9, 2017

(65) Prior Publication Data

US 2017/0329340 A1    Nov. 16, 2017

(30) Foreign Application Priority Data

May 10, 2016   (DE) .......................... 10 2016 208 000

(51) Int. Cl.
*G05D 1/02* (2006.01)
*B60K 31/00* (2006.01)
(Continued)

(52) U.S. Cl.
CPC ....... *G05D 1/0223* (2013.01); *B60K 31/0008* (2013.01); *B60W 30/10* (2013.01);
(Continued)

(58) Field of Classification Search
CPC ............... G05D 1/0223; B60W 30/10; B60W 30/18163; B60W 30/143; B60W 30/16;
(Continued)

(56) References Cited

U.S. PATENT DOCUMENTS 6,116,369 A * 9/2000 King ................... B60K 31/0008
                                                        180/169
9,393,998 B2 * 7/2016 Clarke ................... B60W 30/00
(Continued)

FOREIGN PATENT DOCUMENTS

DE             10012737 A1    9/2001
DE        102004029369 A1    6/2006
(Continued)

OTHER PUBLICATIONS

Search Report for German Patent Application No. 10 2016 208 000.8; dated Jan. 18, 2017.
(Continued)

*Primary Examiner* — Jason Holloway
(74) *Attorney, Agent, or Firm* — Barnes & Thornburg LLP

(57) ABSTRACT

A method for operating a control device for the autonomous guidance of a motor vehicle, wherein a nominal speed is predetermined as a driving speed to be set by the control device and another vehicle driving in front more slowly than the nominal speed is detected by a detection device of the control device, wherein a speed difference of a driving speed of the other vehicle with respect to the nominal speed is greater than zero but smaller than a predetermined maximum value. In this case, an accumulator value is set to a starting value and a current speed value of the speed difference is detected and depending on the speed value, an advantage value is formed and the advantage value is added to the accumulator value. If the accumulator value meets a predetermined overtaking criterion, an overtaking signal is generated for allowing an overtaking maneuver.

9 Claims, 5 Drawing Sheets

(51) Int. Cl.
  *G01S 13/93* (2006.01)
  *B62D 15/02* (2006.01)
  *B60W 30/10* (2006.01)
  *B60W 30/14* (2006.01)
  *B60W 30/16* (2012.01)
  *B60W 30/18* (2012.01)

(52) U.S. Cl.
  CPC .......... *B60W 30/143* (2013.01); *B60W 30/16* (2013.01); *B60W 30/18163* (2013.01); *B62D 15/0255* (2013.01); *G01S 13/931* (2013.01); B60K 2310/264 (2013.01); B60W 2520/10 (2013.01); B60W 2550/302 (2013.01); B60W 2750/308 (2013.01); G01S 2013/935 (2013.01); G01S 2013/9321 (2013.01)

(58) Field of Classification Search
  CPC ....... B60W 2520/10; B60W 2750/308; B60W 2550/302; B62D 15/0255; G01S 13/931; G01S 2013/935; G01S 2013/9321; B60K 2310/264; B60K 31/0008
  See application file for complete search history.

(56) References Cited

U.S. PATENT DOCUMENTS

| 9,576,483 | B2* | 2/2017 | Maass | B60W 50/14 |
| 9,656,673 | B2* | 5/2017 | Clarke | B60W 30/00 |
| 9,669,872 | B2* | 6/2017 | Rebhan | B60Q 9/00 |
| 2011/0196592 | A1* | 8/2011 | Kashi | B60W 30/16 |
| | | | | 701/96 |
| 2016/0052514 | A1* | 2/2016 | Clarke | B60W 30/00 |
| | | | | 701/28 |
| 2016/0231746 | A1* | 8/2016 | Hazelton | G05D 1/0257 |
| 2017/0232970 | A1* | 8/2017 | Schaper | B60W 30/18163 |
| | | | | 701/36 |

FOREIGN PATENT DOCUMENTS

| DE | 102005050277 A1 | 4/2007 |
| DE | 102005050662 A1 | 4/2007 |
| DE | 102014002116 A1 | 8/2015 |
| DE | 102015209952 A1 | 12/2015 |
| EP | 0443185 A2 | 8/1991 |
| EP | 1777143 A1 | 4/2007 |
| JP | 2009248892 A | 10/2009 |

OTHER PUBLICATIONS

Kawabe et al., An Optimal Path Generator Using a Receding Horizon Control Scheme for Intelligent Automobiles, Proceedings of the 2004 IEEE International Conference on Control Applications, Taipei, Taiwan, Sep. 2-4, 2004.

Search Report for European Patent Application No. 17168242.0; dated Oct. 5, 2017.

* cited by examiner

MOTOR VEHICLE CONTROL APPARATUS AND METHOD FOR OPERATING A CONTROL APPARATUS FOR AUTONOMOUSLY DRIVING A MOTOR VEHICLE

PRIORITY CLAIM

This patent application claims priority to German Patent Application No. 10 2016 208 000.8, filed 10 May 2016, the disclosure of which is incorporated herein by reference in its entirety.

SUMMARY

Illustrative embodiments relate to a method for operating a control device which is designed for autonomous guidance or driving of a motor vehicle. In other words, a longitudinal guidance and a transverse guidance of the motor vehicle can be performed by the control device without assistance by a driver. Illustrative embodiments also include the control device which can be operated in accordance with the method, and a motor vehicle having the control device.

BRIEF DESCRIPTION OF THE DRAWINGS

In the text which follows, an illustrative embodiment is described, in which.

DETAILED DESCRIPTION

Figure 1:
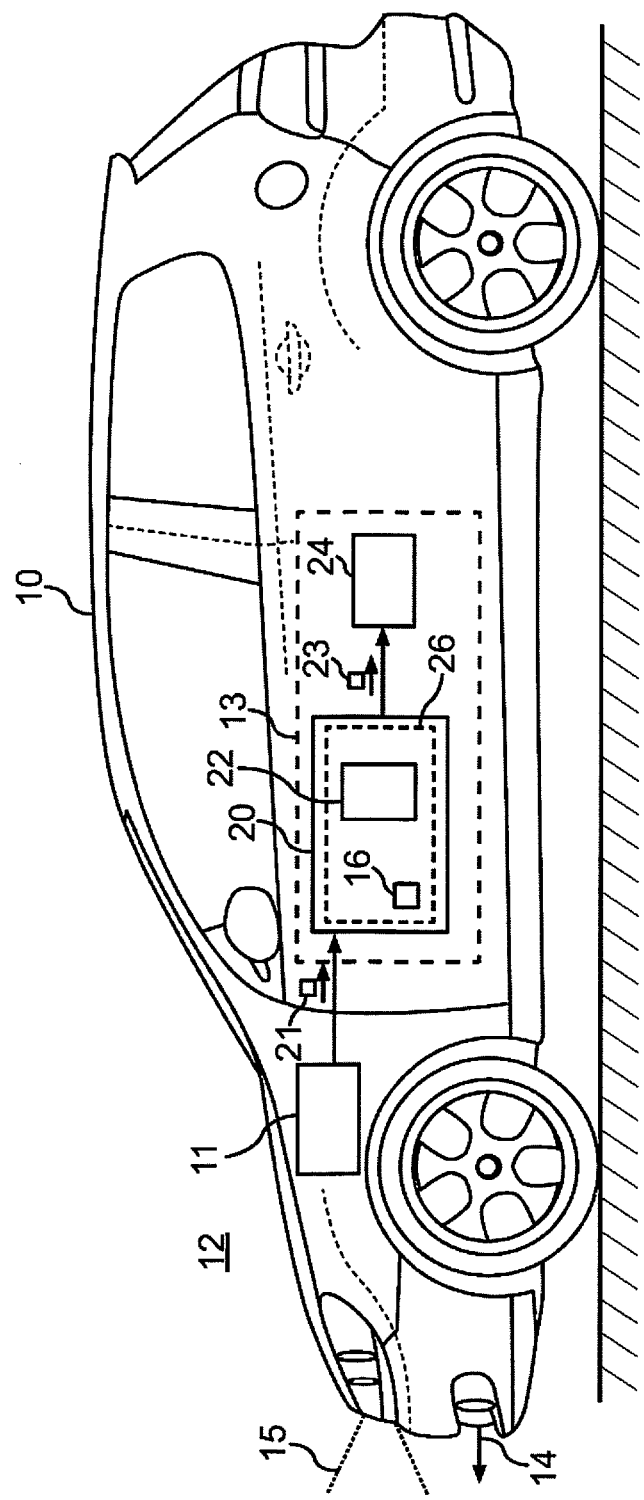
FIG. 1 shows a schematic representation of a disclosed embodiment of the disclosed motor vehicle.

In the development of automated vehicles for road traffic, situations frequently occur in which an automated or autonomously driving vehicle is driving on a multi-lane road. In this context, it may occur that another vehicle driving in front or front vehicle drives only marginally more slowly than a target speed or nominal speed specified to the control device for the longitudinal guidance. A speed disadvantage of 1 to 2 kilometers per hour is not great enough with current control devices to produce a lane change for overtaking the slower front vehicle. This is counteracted, for example, by comfort aspects since an acceleration process for overtaking is associated with steering maneuvers and acceleration forces and engine noises. However, after a few minutes, a human driver or else a passenger would wish that the automated vehicle nevertheless overtakes. Whereas the speed disadvantage appears to be marginal in the current situation, it still has a significant effect in the long term.

A technically similar problem is represented by overtaking a vehicle driving slowly in front on a country road. In this case, the driving lane for the opposite traffic has to be used to overtake. This can still be appropriate if the driving speed of the other vehicle driving in front is distinctly below the nominal speed or also only marginally below the nominal speed but it can be expected that the other vehicle will be driving in front for a relatively long period of time.

From EP 1 777 143 B1 and EP 0 443 185 A2, it is known that in a motor vehicle, a detection device can be provided which can detect objects located in an environment of the motor vehicle, for example, other vehicles, and can also determine a relative speed of the objects with respect to the motor vehicle. A control device which utilizes the detection device for detecting other vehicles can generate an overtaking recommendation or a lane change recommendation depending on the position and the speed values of the other vehicles.

Disclosed embodiments provide estimating, by using a control device for autonomous driving operation, an overtaking situation in which another vehicle driving in front drives only marginally more slowly than a predetermined nominal speed.

A method for operating a control device for the autonomous guidance of a motor vehicle is provided. The autonomous guidance comprises regulating or adjusting a driving speed, that is to say the longitudinal guidance. Additionally, the autonomous guidance can also comprise transverse guidance, that is to say steering of the motor vehicle.

Thus, using the control device, at least the driving speed of the motor vehicle should be adjusted. For this purpose, a driving speed of the motor vehicle which is to be adjusted is specified as nominal speed. The method is based on the driving situation that another vehicle driving in front more slowly than the nominal speed is detected using a detection device during a drive by the control device. The detection device can be provided on the basis, for example, of the prior art described initially. In this context, the method is based on the fact that a speed difference of a driving speed of the other vehicle with respect to the nominal speed is indeed greater than zero (the other vehicle is driving more slowly) but smaller than a predetermined maximum value. In other words, the other vehicle is driving only slightly more slowly than the nominal speed, wherein "slightly" is defined by the maximum value. The maximum value can be, for example, within a range of 2.5 meters per second up to 5 meters per second.

In the driving situation, another vehicle driving in front only marginally more slowly than the nominal speed is thus responsible for the fact that the control device cannot adjust the nominal speed. In this case, the control device must decide whether an overtaking maneuver will be beneficial or whether it is appropriate. In the driving situation described, an accumulator value is therefore set to a starting value. The starting value can be, for example, zero. In a number of test runs performed in succession, the following operation sequence will then be performed in each case. A current speed value of the speed difference is detected. Thus, a distance or a difference of the current driving speed with respect to the nominal speed is determined. For example, one test run per second can be performed or generally in a time interval which can be from 1 second to 2 minutes. Depending on the speed value, an advantage value is formed. The advantage value is all the greater the greater the speed difference is, i.e., the greater the difference between the driving speed of the other vehicle and the nominal speed is (the driving speed being less than the nominal speed). The advantage value is added to the accumulator value. In other words, the accumulator value can have grown or become larger after a number of test runs. If the accumulator value meets a predetermined overtaking criterion, an overtaking signal is generated for allowing an overtaking maneuver. The overtaking signal thus signals a desire to overtake as could be felt, for example, also by a driver or generally a person when it is detected for a relatively long period of time, i.e., for a number of test runs, that the other vehicle driving in front has driven marginally more slowly than the nominal speed.

Disclosed embodiments provide that the driving situation described (other vehicle driving in front marginally more slowly) is evaluated or assessed not only on the basis of a single measurement but also a time context can be taken into consideration, that is to say it can be checked for how long the other vehicle has already been driving in front and with what difference in speed. Accordingly, an overtaking maneuver can be recognized as being appropriate or beneficial even if individual measurements of the speed difference are actually opposed to an overtaking maneuver because, for example, this brings a speed advantage of only 1 meter per second, which in the case of a singular or one-time consideration or speed, for example, would be contrary to aspects of comfort as has been described initially.

The control device designed for carrying out the method can be configured, for example, as a control device for a motor vehicle. The control device is arranged for carrying out a disclosed embodiment of the disclosed method. For this purpose, the control device can have a processor device with program code which is configured to carry out a disclosed embodiment of the disclosed method when executed by the processor device. The processor device can have, for example, a microprocessor or a microcontroller for this purpose. The program code can be stored in a data memory of the processor device.

Disclosed embodiments also include developments, the features of which result in additional benefits.

As already stated, an advantage value is formed in each case for the current speed value of the speed difference. For determining the advantage value, the speed value may be mapped onto an interval which extends from a predetermined minimum value to a predetermined maximum value. The speed value can be mapped onto an interval up to the value 1. Mapping the speed value onto an interval results in the advantage value always specifying a meaningful item of information relating to an advantage of the determined speed difference independently of an absolute driving speed. For calculating the advantage value, the speed value can be divided, for example, by the maximum value which represents the limit for the definition of the other vehicle driving marginally more slowly. If therefore the maximum value is, for example, 3.5 meters per second, the speed value can be divided by 3.5 meters per second which results in the value of 1 as greatest advantage value.

Using the accumulator value renders the method very flexible if it is a matter of taking into consideration a change in the driving situation which can occur during the test runs.

Thus, it can be provided that in a test run, the accumulator value is reset to the starting value and/or the current speed value or the current advantage value is ignored if it is detected that there is no overtaking lane for the overtaking maneuver. If thus another vehicle driving in front is detected whilst an overtaking maneuver is still possible and this overtaking option is lost during the observation of the other vehicle, i.e., during the test runs, this is taken into consideration. This avoids the overtaking signal being generated as long as there is no overtaking lane available. Thus, the accumulator value is reset time and again to the starting value or the accumulator valve is at least not changed in each test run in which the lack of an overtaking lane is detected.

The accumulator value can be reset to the starting value in a test run and/or the current speed value or the current advantage value ignored if the speed value or the advantage value is greater than a predetermined termination value. The speed value becomes greater if the other vehicle driving in front becomes slower. This can be the case, for example, if the other vehicle driving in front brakes. So that using the accumulator value does not become greater very rapidly and immediately meets the overtaking criterion, the accumulator value is reset and/or the current speed value or the current advantage value ignored. In general, it is checked whether a change in the driving situation is greater than a predetermined termination value. This prevents an unwanted overreaction of the control device. A generation of the overtaking signal may then be made dependent on a predetermined other overtaking criterion. In other words, the driving situation is newly evaluated on the basis of another overtaking criterion. The overtaking will then be decided by the other overtaking criterion that, for example, can take into consideration why the other vehicle has become slower. If, for example, a red traffic light is ahead, there will be no overtaking. The other overtaking criterion can be extracted from the prior art and is not a component of the present disclosure.

In a test run, the accumulator value can be reset to the starting value and/or the current speed value or the current advantage value can be ignored if a period of time since which the detection device detects the other vehicle with a confidence value of greater than a predetermined minimum confidence value is less than a predetermined minimum period. A confidence value specifies how reliably the other vehicle could be detected or classified by the detection device. A confidence value can be output, for example, by a statistical classifier as a component of a detection result. For example, such a confidence value can be generated or output by a hidden Markov model or a neural network. Thus, if the detection of the other vehicle has not yet been detected long enough (defined by the minimum duration), the speed value or the advantage value is ignored and/or the accumulator value capped at the starting value. In other words, the evaluation according to the method only starts after a predetermined period of time which is specified by the minimum duration.

In this situation, in which another vehicle has indeed been detected but has not yet been detected for the minimum duration with a confidence value of greater than the minimum confidence value, it may be provided that for at least one subsequent test run the advantage value then determined in each case is scaled with a scaling factor which is greater than 1. In other words, the enlargement of the accumulator value is accelerated. Thus, as soon as the minimum duration is exceeded or past, the advantage value is added to the accumulator value enlarged or scaled by the scaling factor. Accordingly, the overtaking criterion is met in fewer test runs than without a scaling factor. This compensates for the waiting time (minimum duration) before a detected other vehicle is taken into consideration at all.

If it is detected in a test run that the speed value is 0 (the other vehicle is driving at the nominal speed) or the other vehicle is even driving faster than the nominal speed, in this case the accumulator value may be reset to the starting value and/or the speed value or the advantage value ignored. At least one further test run is however performed. In other words, the method will not be terminated already if it is detected once that the other vehicle is now driving fast enough (at the nominal speed or faster). Instead, a hysteresis is provided, by which the further carrying out of at least one test run is ensured. This prevents an abrupt change in the control characteristic of the control device.

To decide on the basis of the accumulator value whether the overtaking signal should be generated, it may be provided that the overtaking criterion specifies that the accumulator value is greater than a predetermined threshold value and/or that a rate of increase of the accumulator value is greater than a predetermined minimum rate. Thus, it is possible to react to the absolute value of the accumulator value and/or to its rate of change with time. In addition or alternatively, it can be provided that the overtaking criterion is set depending on a remaining residual planned driving distance. For example, the threshold value and/or the minimum rate can be set depending on the remaining driving distance. The driving distance can be determined, for example, using a known or set navigation destination. This results in the accumulated advantage as represented by the accumulator value is set in relationship to the driving distance. If the remaining driving distance is, for example, only 1 kilometer, an overtaking maneuver is less beneficial than for the case in which a driving distance of 200 kilometers still lies ahead.

Disclosed embodiments also include a motor vehicle which has the disclosed control device. The motor vehicle may be designed as a motor vehicle, for instance, a passenger car or truck. The control device can be a component of a driver assistance device by which the autonomous or driverless driving operation described is provided.

The illustrative embodiment explained in the text which follows is a disclosed embodiment. In the illustrative embodiment, the described components of the disclosed embodiment in each case represent individual features of the disclosed embodiments, to be considered independently of one another, which in each case also develop the embodiments independently of one another and thus are also to be considered individually or in another combination than the shown combination as a component of the embodiments. Furthermore, the disclosed embodiment described can also be supplemented by other features of the embodiments already described.

In the figures, functionally equal elements are in each case provided with the same reference symbols.

FIG. 1 shows a motor vehicle 10 which can be, for example, a motor vehicle, for instance, a passenger motor vehicle or truck. The motor vehicle 10 can have a detection device 11 for detecting vehicles driving in front and other objects and roads in an environment 12 of the motor vehicle 10 and a driver assistance device 13 for autonomous or driverless guidance of the motor vehicle 10. Using the driver assistance device 13, a driving speed 14 of the motor vehicle 10 can be regulated or adjusted. In the example described, the driving speed 14 should be set to a nominal speed 16 by the driver assistance device 13. The nominal speed 16 can be predetermined, for example, by a driver. In this context, the environment 12 can be monitored in a manner known per se from the prior art by the detection device 11. A detection area 15 of the detection device 11 is directed at traffic located ahead.

Figure 2:
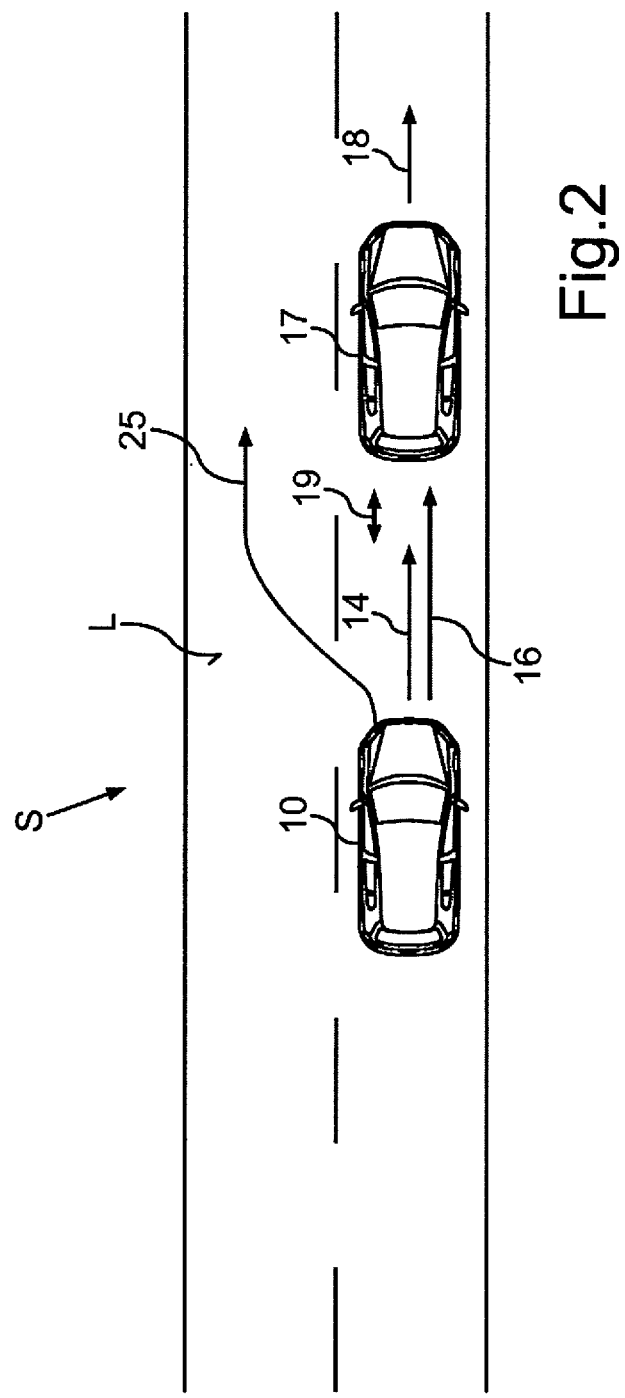
FIG. 2 shows a diagram for illustrating a driving situation in which the disclosed method can be performed.

In FIG. 2 it is illustrated in this context how a current driving situation S can be observed or detected by the detection device 11 in this manner. The detection device 11 can detect, if another vehicle 17, the driving speed 18 of which is less than the nominal speed 16, is driving in front of the motor vehicle 10. Since the motor vehicle 10 has to adapt its driving speed 14, that is to say drive more slowly than the nominal speed 16, this can result in a speed difference 19 with respect to the nominal speed 16. The detection device 11 can detect furthermore that in addition to a driving lane currently driven, an overtaking lane L is available via which the motor vehicle 10 could overtake the other vehicle 17 driving in front. The detection device 11 signals the detected objects as a detection result 21 to the driver assistance system 13.

A decision for overtaking can be carried out by a control device 20 of the driver assistance system 13 depending on a detection result 21 of the detection device 11, performed by using of a decision module 22, by which it is decided, whether an overtaking signal 23 should be generated which can signal to a maneuver planning system 24 of the driver assistance device 13 that the initiation of an overtaking maneuver 25 is appropriate or desired. The decision module 22 can be provided, for example, as a program module of a processor device 26 of the control device 20. The program module can comprise in a manner known per se program codes for a control program of the control device 20.

Figure 3:
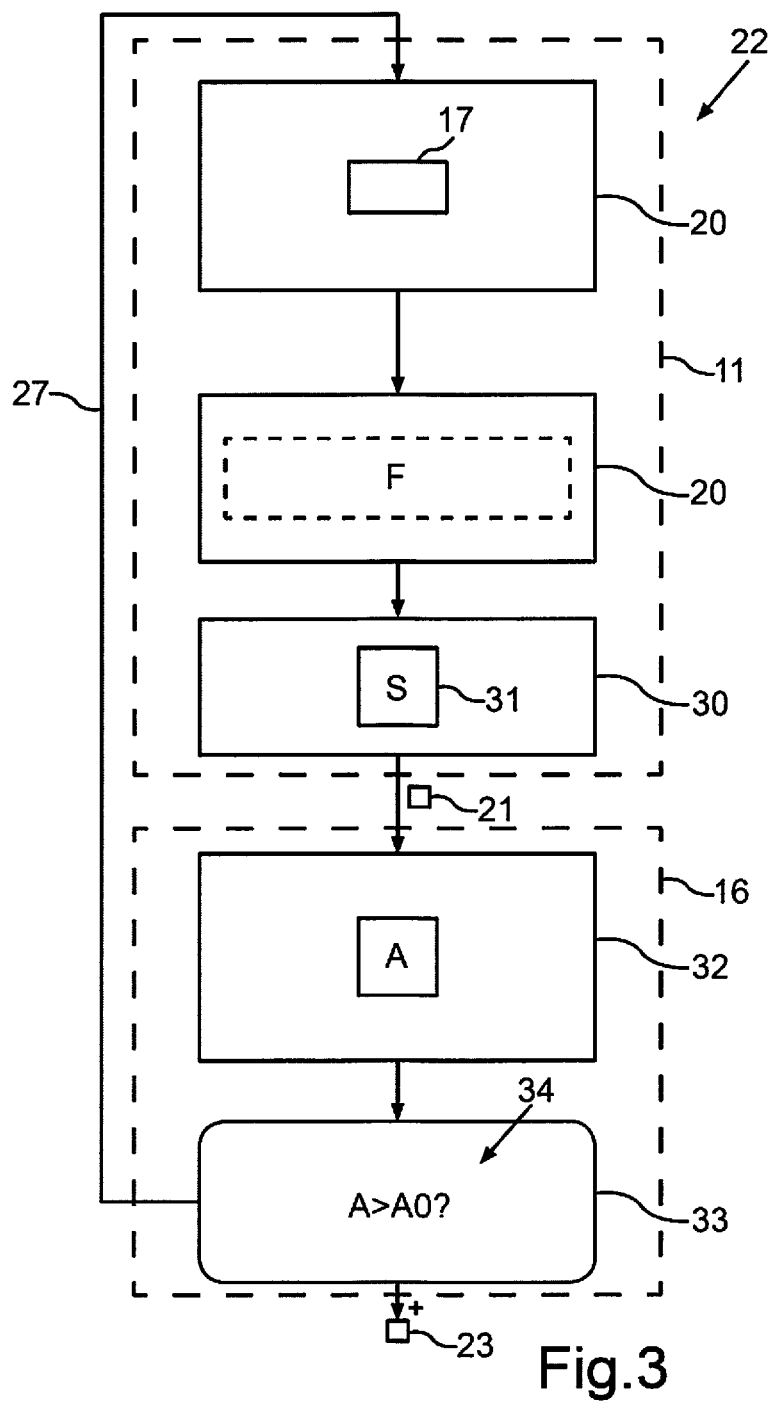
FIG. 3 shows a flowchart for describing a disclosed embodiment of the disclosed method as can be performed in the motor vehicle of FIG. 1.

FIG. 3 illustrates the decision-finding by the decision module 22. In a number of test runs 27, an object detection 28 for detecting moving or dynamic objects such as, for example, the other vehicle 17, an infrastructure detection 29 for detecting driving lanes such as the overtaking lane L and cartography 30 for combining the detected infrastructure objects and the detected dynamic objects in a digital map 31 can be performed. Thus, the current driving situation S can be determined. This driving situation S can then be conveyed as a detection result 21 by the detection device 11 to the control device 16. The control device 16 can thereupon carry out a method 32 by which the advantageousness of the overtaking maneuver 25 is determined, by taking into consideration that the speed difference 19 is only slight, i.e., the current driving speed 14 is only marginally lower than the nominal speed 16.

By using an evaluation 33, an overall advantageousness of a change of driving lane to the overtaking lane L can be determined. The overall advantageousness can be expressed, for example, by an accumulator value A, the calculation of which is explained by way of example in the text which follows FIG. 4 and FIG. 5. For the purpose of deciding, an overtaking criterion 34 can be used as a basis which, for example, can tell that the overall advantageousness as the accumulator value A must be greater than a threshold value A0.

Figure 4:
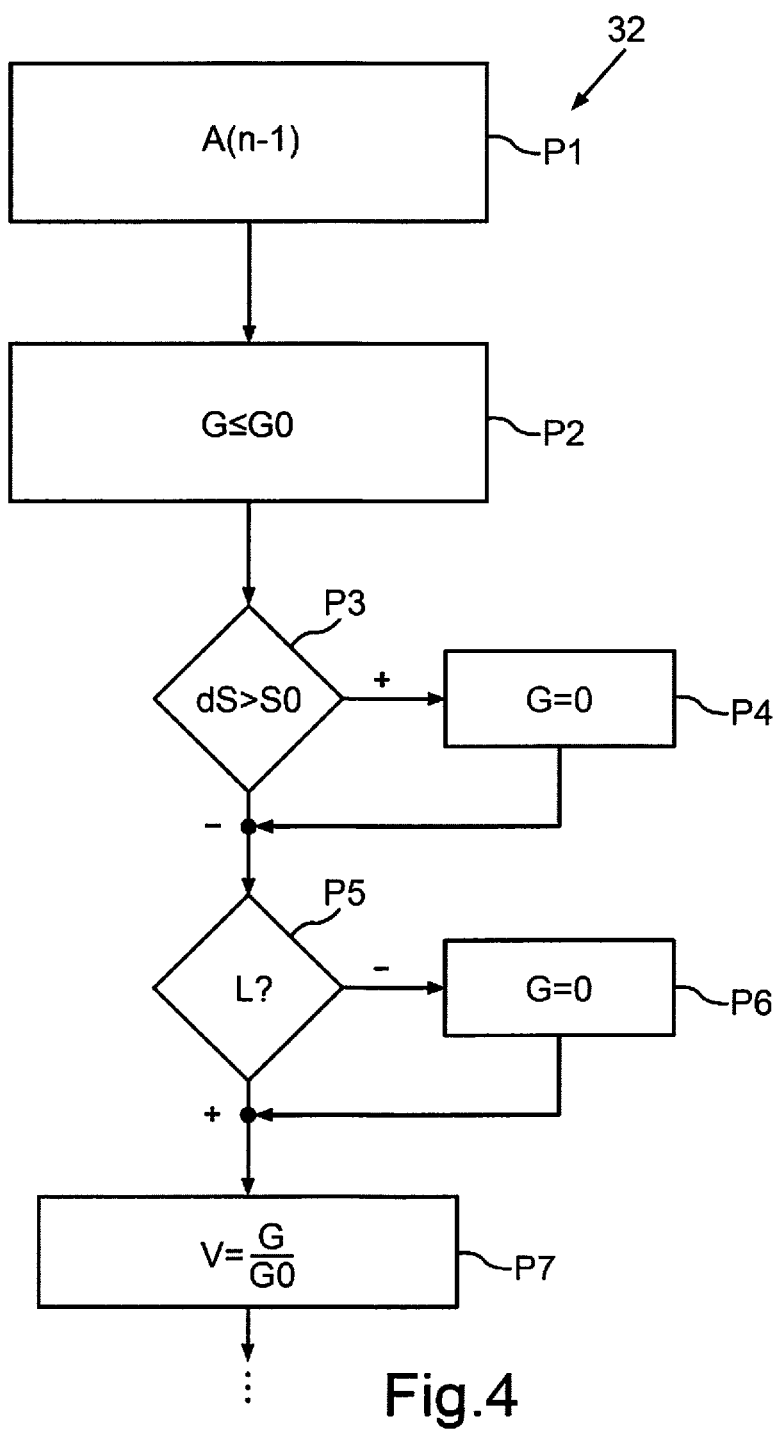
FIG. 4 shows a detailed view of the flowchart of FIG. 3.
Figure 5:
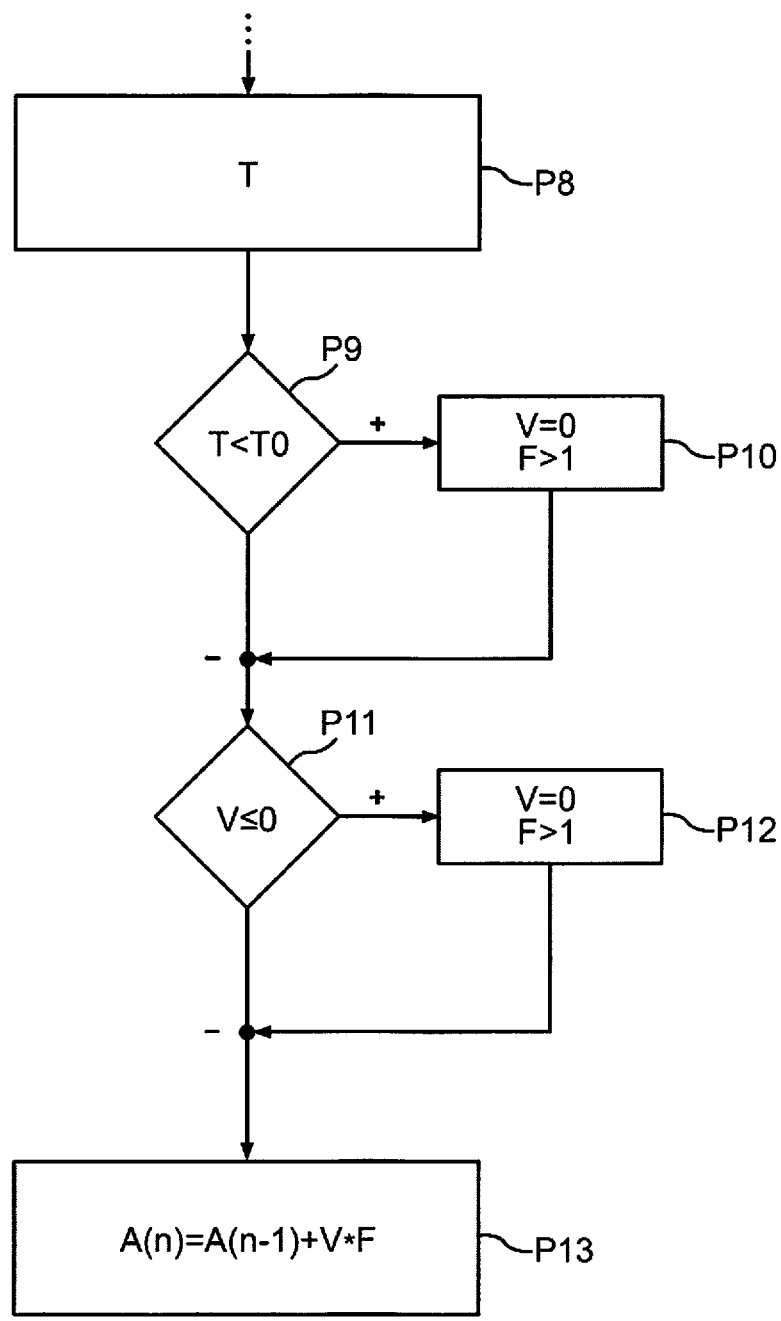
FIG. 5 shows a further detailed view of the flowchart of FIG. 3.

In conjunction with FIG. 4 and FIG. 5, it is assumed that the test runs 27 are identified by a counter value n.

For the first test run n=1, the accumulator value $A(n=0)$ can be set to a starting value, for example, the value 0. In a first test operation at P1, the accumulator value A of the preceding test run n−1 can be loaded from a memory. In a test operation at P2, it can be checked whether a speed value G of the speed difference 19 is less than a maximum value G0 which specifies from when there is a marginal speed difference. If the speed value G is greater than the maximum value G0, another known method can be used as a basis for deciding about the overtaking maneuver 25, instead of the method 32. However, that is not a component of the present description. The maximum value G0 can be, for example, 3.5 meters per second.

In an operation at P3, it can be checked whether the current driving situation S has changed significantly in comparison with the driving situation in the preceding test run n−1. A difference dS in the driving situation S can be defined, for example, due to the fact that the speed difference 19 has changed. This points, for example, to the beginning of a braking or a braking maneuver of the other vehicle 17. If the difference dS is greater than a threshold value S0 (symbolized by a + in FIG. 3), the accumulator value A can be reset to a starting value and/or the speed value G can be ignored which can be achieved in the test operation at P4 by setting a speed value of 0. Accordingly, the current speed value is overwritten.

If the change dS of the driving situation S is less than the threshold value S0 (symbolized by a – in FIG. 3), it can be checked in a test operation at P5 whether an overtaking lane L is available. If this is not the case (symbolized by –), the accumulator value A can be reset to the starting value and/or the speed value G can be ignored which can be achieved in test operation at P6 again by setting the value 0 for the speed value G.

From the speed value G, an advantage value V can be calculated in a test operation at P7 in that, for example, the speed value G is standardized to the maximum value G0: V=G/G0.

The test operation at P7 can be followed by the test operation at P8 which is shown in FIG. 5. In test operation at P8, it can be checked for which time period T the detection device 11 has already detected the other vehicle 17 at least with a predetermined minimum confidence value. In a test operation at P9, it can be checked whether the time period T is less than a predetermined minimum period T0. If this is the case (symbolized by +), the advantage value V can be ignored in a test operation at P10 (i.e., V=0 set or overwritten) and for at least one future test run n+1 a scaling factor F can be set to a value of greater than 1, e.g., a value between 1 and 10.

If, in contrast, the time period T is more than a minimum period T0 (symbolized by –), it can be checked in a test operation at P11 whether the other vehicle 17 has a driving speed 18 which is equal to the nominal speed 16 or even greater than the nominal speed 16 in the current test run n. This means that the advantage value V is less than or equal to 0. If this is the case (symbolized by +), the advantage value can be ignored in a test operation at P12 (V=0) and the scaling factor F can be set to a value of greater than 1, e.g., a value between 1 and 10.

Finally, the current accumulator value A(n) can be calculated in a test operation at P13 in that the advantage value V multiplied by the scaling factor F is added to the accumulator value A(n−1) of the preceding test run n−1: A(n)=A(n−1)+V*F.

In the evaluation 33 (FIG. 3), it can then be checked whether the overtaking criterion 34 is met. If this is the case (symbolized by + in FIG. 3), the overtaking signal 23 can be generated. Otherwise, a further test run 27 can be performed.

Thus, it is evaluated or checked at the motor vehicle 10 on a multi-lane road with a slightly slower front vehicle whether it is beneficial to overtake this slightly slower front vehicle. A consideration related to a single point in time would in each case not justify the change of driving lane compared with the only marginal or small gain in speed. A human driver, however, would overtake after some time, nevertheless, since over a long time, a slight speed disadvantage is incurred. Often, subjective factors such as sight impairment or a driving style felt as being sluggish motivate a role as additional decision factors. This is considered implicitly by the control device 16 in the manner described. For this purpose, the gain with a change of driving lane is determined. This is initially represented as speed gain by the speed value G. The gain in advantageousness is thus obtained as gained delta speed. This advantageousness, however, is restricted to prevent any unwanted behavior. This is represented by the test operation at P3 in general. Thus, the function has a limit or a boundary so that, for example, with a front vehicle driving in front very slowly this does not result in an uncontrolled immediate initiation of an overtaking maneuver 25. Furthermore, situation-specific decision criteria are used as a basis, thus, it is checked, for example, whether there is still an overtaking lane L available and/or whether the other vehicle 17 has been detected reliably and/or whether the other vehicle 17 has accelerated.

Overall, the algorithm functions similar to a PID controller (PID: Proportional, Integral, Differential). There are state variables which influence a control action (driving lane change), wherein a state integration is achieved by using the accumulator value A, and following fast-acting state changes (e.g., loss of a overtaking lane L) discarding a decision or also accepting it.

Overall, the example shows how a marginal, integral benefit can be evaluated in the evaluation of the use of overtaking a another vehicle driving slightly slower in front.

LIST OF REFERENCE SYMBOLS

10 Vehicle
11 Detection device
12 Environment
13 Driver assistance device
14 Driving speed
15 Detection area
16 Nominal speed
17 Other vehicle
18 Driving speed
19 Speed difference
20 Control device
21 Detection result
22 Environment surveillance
23 Overtaking signal
24 Maneuver planning system
25 Overtaking maneuver
26 Processor device
27 Test run
28 Object detection
29 Infrastructure detection
30 Cartography
31 Map
32 Test
33 Evaluation
34 Overtaking criterion
A Accumulator value
A0 Threshold value
dS Difference
L Overtaking lane
F Scaling factor
G Speed value
G0 Maximum value
P1 Test operation
P2 Test operation
P3 Test operation
P4 Test operation
P5 Test operation
P6 Test operation
P7 Test operation
P8 Test operation
P9 Test operation
P10 Test operation
P11 Test operation
P12 Test operation
P13 Test operation
S Driving situation
T Period of time
T0 Minimum period
V Advantage value

The invention claimed is:

1. A method for operating a control device for autonomous guidance of a motor vehicle, the method comprising:
using a predetermined nominal speed as a driving speed of the motor vehicle to be set by the control device;
detecting another vehicle driving in front of the motor vehicle at a driving speed that is slower than the nominal speed by a detection device of the control device, wherein a speed difference between the driving speed of the other vehicle with respect to the nominal speed is greater than zero but smaller than a predetermined maximum value;
setting an accumulator value to a starting value;
forming an advantage value based on the speed difference detected during a number of successively performed test runs;
detecting a current value of the speed difference;
offsetting the accumulator value by adding the advantage value to the accumulator value; and
generating an overtaking signal enabling an overtaking maneuver in response to the accumulator value meeting a predetermined overtaking criterion,
wherein, in a test run, a period of time since which the detection device detects the other vehicle with a confidence value greater than a predetermined minimum confidence value is determined and, in response to the period of time being less than a predetermined minimum period, the speed value or the advantage value is ignored and/or the accumulator value is reset to the starting value.

2. The method of claim 1, wherein, the advantage value is formed by mapping the value of the speed difference onto an interval up to a predetermined maximum value of 1.

3. The method of claim 1, wherein, in a test run, the accumulator value is reset to the starting value and/or the current value of the speed difference or the advantage value is ignored in response to detection that there is no overtaking lane for the overtaking maneuver.

4. The method of claim 1, wherein, in a test run, the accumulator value is reset to the starting value and/or the value of the speed difference or the advantage value is ignored in response to the value of the speed difference or the advantage value being greater than a predetermined termination value.

5. The method of claim 1, further comprising, for at least one subsequent test run, the advantage value determined in each case is scaled with a scaling factor which is greater than 1.

6. The method of claim 1, further comprising, detecting in a test run whether the speed value is 0 or the other vehicle is driving faster than the nominal speed and in response, resetting the accumulator value to the starting value and/or the speed value or ignoring the advantage value and performing at least one further test run.

7. The method of claim 1, wherein the overtaking criterion specifies that the accumulator value is greater than a predetermined threshold value and/or that a rate of increase of the accumulator value is greater than a predetermined minimum rate and/or wherein the overtaking criterion is set depending on a remaining residual planned driving distance.

8. A control device for a motor vehicle, the control device comprising a processor device with program code which performs a method when executed by the processor device, the method comprising:
using a predetermined nominal speed as a driving speed of the motor vehicle to be set by the control device;
detecting another vehicle driving in front of the motor vehicle at a driving speed that is slower than the nominal speed by a detection device of the control device, wherein a speed difference between the driving speed of the other vehicle with respect to the nominal speed is greater than zero but smaller than a predetermined maximum value;
setting an accumulator value to a starting value;
forming an advantage value based on the speed difference detected during a number of successively performed test runs;
detecting a current value of the speed difference;
offsetting the accumulator value by adding the advantage value to the accumulator value; and
generating an overtaking signal enabling an overtaking maneuver in response to the accumulator value meeting a predetermined overtaking criterion,
wherein, in a test run, a period of time since which the detection device detects the other vehicle with a confidence value greater than a predetermined minimum confidence value is determined and, in response to the period of time being less than a predetermined minimum period, the speed value or the advantage value is ignored and/or the accumulator value is reset to the starting value.

9. A motor vehicle having a control device according to claim 8.

* * * * *